United States Patent
Lee

(10) Patent No.: US 9,966,805 B2
(45) Date of Patent: May 8, 2018

(54) ELECTRIC MOTOR AND METHOD OF MAKING THE SAME

(71) Applicant: Johnson Electric S.A., Murten (CH)

(72) Inventor: Mei Yee Lee, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 329 days.

(21) Appl. No.: 14/752,308

(22) Filed: Jun. 26, 2015

(65) Prior Publication Data

US 2015/0381011 A1 Dec. 31, 2015

(30) Foreign Application Priority Data

Jun. 27, 2014 (CN) .......................... 2014 1 0305778

(51) Int. Cl.
H02K 1/17 (2006.01)
H02K 1/18 (2006.01)
H02K 15/03 (2006.01)

(52) U.S. Cl.
CPC .............. *H02K 1/17* (2013.01); *H02K 15/03* (2013.01); *H02K 2213/03* (2013.01)

(58) Field of Classification Search
CPC H02K 1/17; H02K 1/18; H02K 1/182; H02K 1/185; H02K 1/187
USPC ....................................... 310/154.07; 29/596
See application file for complete search history.

(56) References Cited

U.S. PATENT DOCUMENTS

| 6,362,551 B1* | 3/2002 | Horng ................. F04D 25/0606 310/156.12 |
| 6,831,387 B2* | 12/2004 | Kondo ................... H02K 15/03 310/154.03 |
| 8,847,453 B2* | 9/2014 | Bayer ................... H01F 7/0221 310/154.07 |
| 2003/0101570 A1* | 6/2003 | Kawakami ............. H02K 15/03 29/596 |
| 2005/0066515 A1* | 3/2005 | Peresada .............. H02K 1/2786 29/596 |
| 2007/0035192 A1* | 2/2007 | Jeon ........................ H02K 15/03 310/156.38 |
| 2007/0057588 A1* | 3/2007 | Hyodo ...................... H02K 1/17 310/154.07 |
| 2010/0033036 A1* | 2/2010 | Ortt .......................... H02K 1/17 310/50 |
| 2010/0156203 A1* | 6/2010 | Nemoto ................. H02K 23/04 310/43 |
| 2010/0231066 A1* | 9/2010 | Korner ..................... H02K 1/32 310/61 |

(Continued)

FOREIGN PATENT DOCUMENTS

DE 102006049866 A1 * 4/2008 ............. H02K 1/278
JP 2003 189557 7/2003
JP 2010213569 A * 9/2010 ............. H02K 23/04

*Primary Examiner* — Jeremy Luks

(74) *Attorney, Agent, or Firm* — Muncy, Geissler, Olds & Lowe, P.C.

(57) ABSTRACT

An electric motor includes a stator and a rotor rotatably mounted to the stator. The stator includes a housing having an open end, a plurality of adhesive strips applied on an inner surface of the housing, a plurality of magnets bonded to the inner surface of the housing by the adhesive strips, and an end cap assembly mounted to the opening end of the housing. The adhesive covers at least 70% of the area of the outer surface of each magnet after the magnets are assembled to the housing.

12 Claims, 9 Drawing Sheets

(56) References Cited

U.S. PATENT DOCUMENTS

2011/0298313 A1* 12/2011 Osborne ................ H02K 1/17
310/50

* cited by examiner

ELECTRIC MOTOR AND METHOD OF MAKING THE SAME

CROSS REFERENCE TO RELATED APPLICATIONS

This non-provisional patent application claims priority under 35 U.S.C. § 119(a) from Patent Application No. 201410305778.3 filed in The People's Republic of China on Jun. 27, 2014, the entire contents of which are hereby incorporated by reference.

FIELD OF THE INVENTION

This invention relates to an a electric motor and in particular to a permanent magnet motor having low noise during operation.

BACKGROUND OF THE INVENTION

Permanent magnet motors are widely used, especially in automobiles. A permanent magnet motor typically includes a stator having permanent magnets and a wound rotor rotatably mounted to the stator. The stator includes a housing accommodating the magnets. The magnets are bonded to the housing by adhesive. During the bonding process, adhesive is applied on the outer surface of the magnets. Then the magnets are placed on a holder, and then the magnets are pressed to the inner surface of the housing by the holder, such that the magnets are bonded to the housing by the adhesive.

As the magnets with adhesive thereon should be positioned on the holder manually, two circumferential ends of the outer surface of the magnet should be free of adhesive for operator grabbing. As a result, circumferential ends of the magnets are not bonded to the housing due to the absence of the adhesive, and thus gaps are formed between the inner surface of the housing and the outer surface of the magnet at the circumferential ends of the magnets. When the motor operates, high frequency resonance will occur between the housing and the magnets where the gaps exit, due to the interaction between the magnets and the wound rotor. Such resonance results in undesirable noise.

SUMMARY OF THE INVENTION

Thus, there is a desire for an electric motor having less resonance.

Accordingly, in one aspect thereof, the present invention provides an electric motor comprising a stator and a rotor mounted to the stator. The stator comprises a housing having an open end; a plurality of adhesive strips applied on an inner surface of the housing; a plurality of magnets bonded to the inner surface of the housing by the adhesive strips, and an end cap assembly mounted to the opening end of the housing. The adhesive covers at least 70% of the outer surface of each magnet after the magnets are assembled to the housing.

Preferably, the adhesive strips extend in a circumferential direction of the housing.

Preferably, the adhesive strips are spaced from each other in an axial direction of the housing.

Preferably, the adhesive strips are parallel to each other.

Preferably, each magnet has a first axial end projecting on the inner surface of the housing at a first line, and a second axial end projecting on the inner surface of the housing at a second line, a first one of the adhesive strips located between the first line and the second line is arranged closest to the first line and spaced from the first line by a first distance.

Preferably, the first distance is from 0.5 mm to 1.0 mm.

Preferably, a second one of the adhesive strips located between the first line and the second line is arranged closest to the second line, a distance between the second adhesive strip and the second line is less than the first distance.

Preferably, the second distance is from 0 mm to 0.5 mm.

Alternatively, the adhesive strips extend in an axial direction of the housing.

Preferably, the housing has a non-circular cross section.

Preferably, the housing has a polygon cross section, comprising four side portions and four corner portions, the side portions and corner portions are arranged alternately in a circumferential direction of the housing, and the corner portion is curved and convex.

Preferably, the side portion is curved and convex.

Preferably, the side portion comprises two arc segments and a straight segment connected between the arc segments, each of the arc segments adjoining a respective corner portion.

Preferably, the magnets are arranged corresponding to the corner portions, in such a manner that a circumferential central portion of each magnet corresponds to a respective corner portion, and two circumferential end portions of the magnet corresponds to side portions adjacent to the corner portion.

Preferably, the magnet is bonded to the inner surface of the housing by at least three adhesive strips, at least one of the adhesive strip is applied on the inner surface of the corner portion, and at least one of the adhesive strips is applied on the inner surface of the side portion adjacent to the corner portion.

Preferably, the adhesive strips cover over 80% of the outer surface of the magnet.

Preferably, the adhesive strips cover at least 90% of the outer surface of the magnet.

The present invention also provides a method of manufacturing the electric motor.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
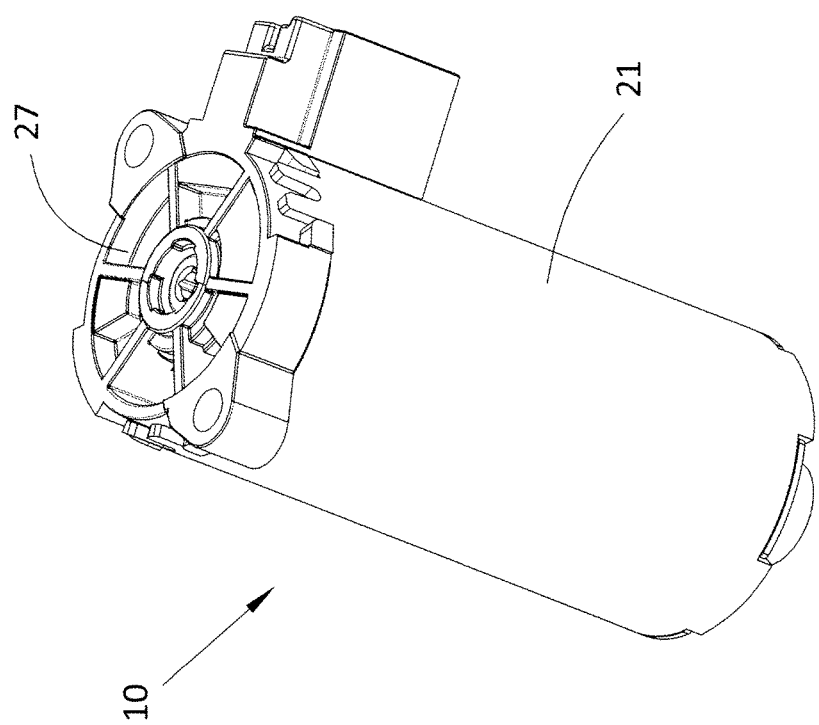
FIG. 1 shows an electric motor according to a first embodiment of the present invention.
Figure 2:
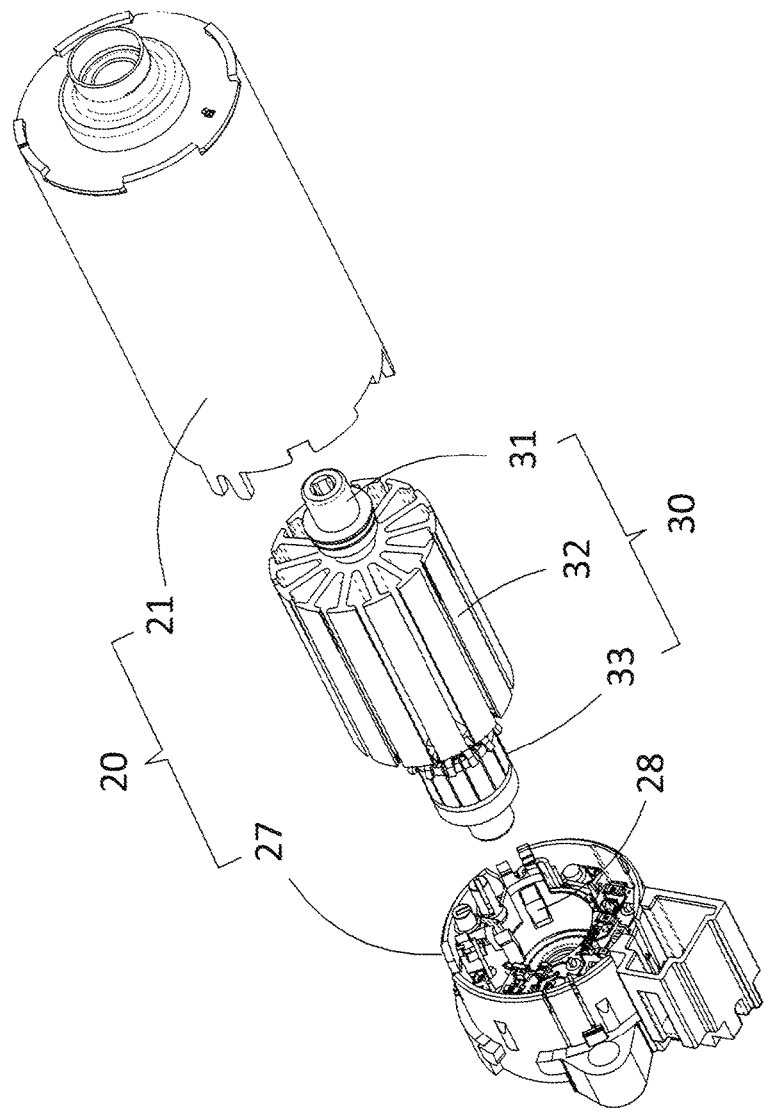
FIG. 2 is an exploded view of the motor of FIG. 1.

FIGS. 1 and 2 show a motor 10 according to a first embodiment of the present invention. The motor 10 includes a stator 20 and a rotor 30 mounted to the stator 20.

The rotor 30 includes a shaft 31, a rotor core 32 and a commutator 33 fixed on the shaft 31. The rotor 30 further includes windings (not shown) wound on the rotor core 32 and electrically connected to segments of the commutator 33.

The stator 20 includes a housing assembly 21 accommodating the rotor 30, and an end cap assembly 27 mounted to an axial open end of the housing assembly 21. The end cap assembly 27 is equipped with a plurality of brushes 28 electrically connectable to a power source. The brushes 28 are in sliding contact with the segments of the commutator 33, to supply power to the windings.

Figure 3:
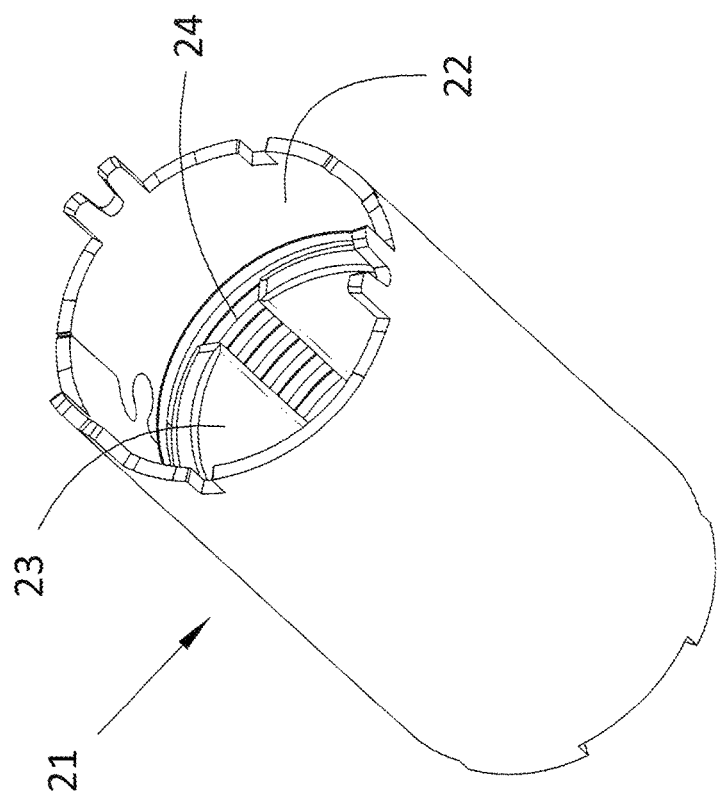
FIG. 3 shows a housing assembly of the motor of FIG. 2, viewed from another aspect.
Figure 4:
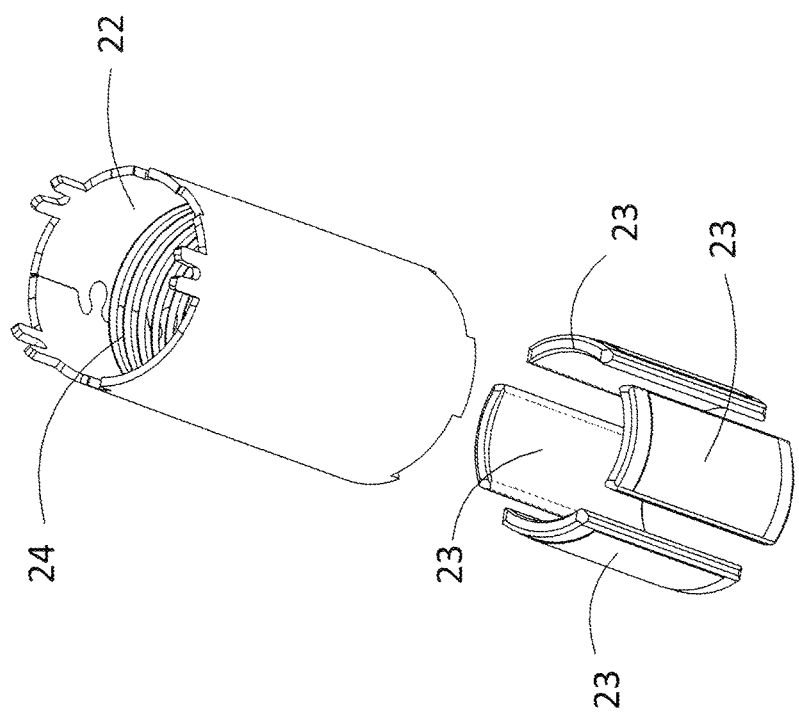
FIG. 4 is an exploded view of the housing assembly of FIG. 3.

Referring to FIGS. 3 and 4, the housing assembly 21 includes a housing 22 and a plurality of magnets 23 attached to an inner periphery of the housing 22. The magnets 23 are connected to the inner periphery of the housing 22 by adhesive. Before bonding the magnets 23 onto the housing 22, adhesive is applied onto the inner surface of the housing 22, rather than onto the outer surface of the magnets 23.

In this embodiment, the housing 22 is substantially cylindrical and has an annular cross section. The adhesive is formed as a plurality of adhesive strips 24 on the inner surface of the housing 22, extending along inner circumferences of the housing 22. In the present embodiment, the adhesive strips 24 are parallel and equidistantly spaced. Preferably, the adhesive strips 24 are formed in a closed annular shape. Alternatively, the adhesive strips 24 can be formed in an unclosed annular shape.

Figure 5:
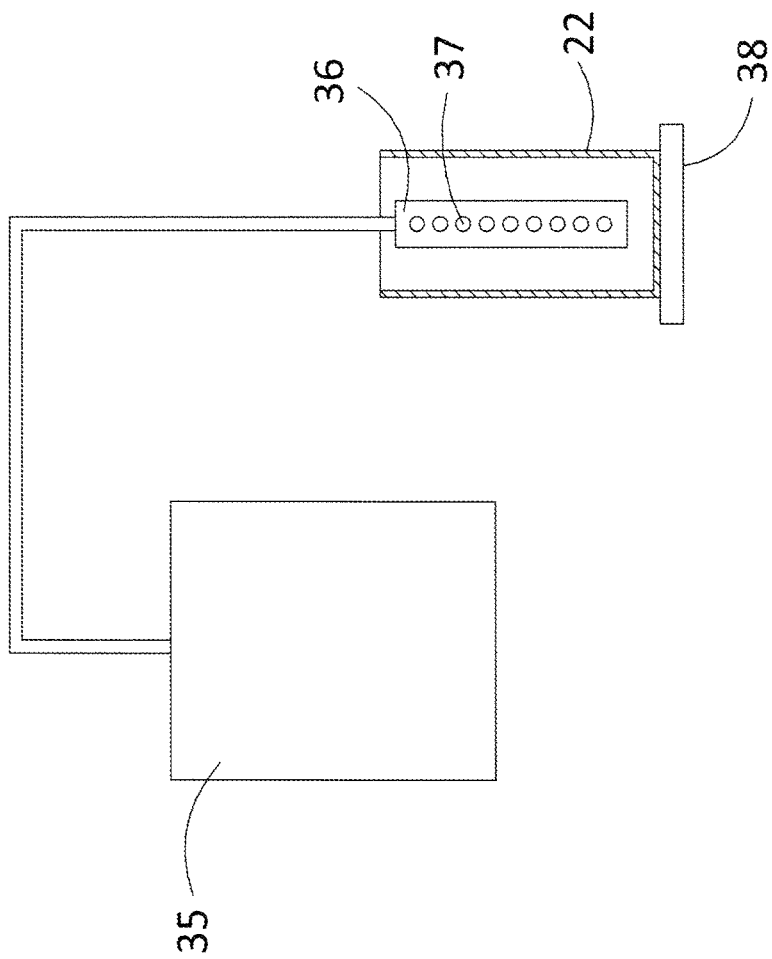
FIG. 5 is a sketch illustrating the process of applying the adhesive.

FIG. 5 is a sketch illustrating the process of applying the adhesive onto the housing 22. The adhesive is contained in a container 35 which is connected to a nozzle 36 by hose. The nozzle 36 is located in the housing 22 which is supported by a rotary table 38. The outlets 37 are located adjacent to the inner surface of the housing 22 with a small clearance there between. The housing 22 then rotates with the rotary table 38 relative to the nozzle 36, keeping the clearance between the outlets 37 of the nozzle 36 and the inner surface of the housing 22 constant. When the housing 22 rotates, the adhesive protruding from the outlets 37 of the nozzle 36 evenly applied on the inner surface of the housing 22, forming a plurality of adhesive strips 24 simultaneously.

When bonding the magnets 23, the magnets 23 are positioned on a holder (not shown), then the holder together with the magnets 23 are positioned in the housing 22 which has adhesive strips 24 applied thereon. The outer surfaces of the magnets 23 are facing the inner surface of housing 22 and the adhesive strips 24. Then, the holder expands and pushes the magnets 23 to the inner surface of the housing 22. The magnets 23 are further pressed towards the inner surface of the housing 22 after the magnets 23 contact the adhesive strips 24. Therefore, the magnets 23 are bonded to the housing 22 by the adhesive strips 24. As the adhesive strips 24 extend along circumferences of the inner periphery of housing 22, the magnets 23, having less circumferential length than the housing 22, are thus bonded to the adhesive strips 24 along all its circumferential length. That is, each magnet 23 is bonded to the housing 22 from one circumferential edge to the other circumferential edge of the magnet. As such, the magnets 23 are bonded onto the housing 22 more firmly, thereby reducing noise caused by high frequency resonance of the magnets 23 and the housing 22 during operation of the motor 10.

Further, the adhesive strips 24 become thinner and wider under the pressure applied by the magnets 23 when the magnets 23 are pressed towards the housing 22. The adhesive strips 24 spread on the outer surface of the magnet 23 and cover more of the area of the outer surface of the magnet 23, thus strengthening the bonding force between the magnets 23 and the housing 22. In the present invention, the adhesive covers at least 70% of the outer surface of the magnet 23, to ensure a good bonding strength between the magnet 23 and the housing 22. In this embodiment, the coverage of the adhesive on the magnets is about 80%. The coverage of the adhesive on the outer surface of the magnets 23 is preferably more than 90%, and 100% is ideal.

Figure 6:
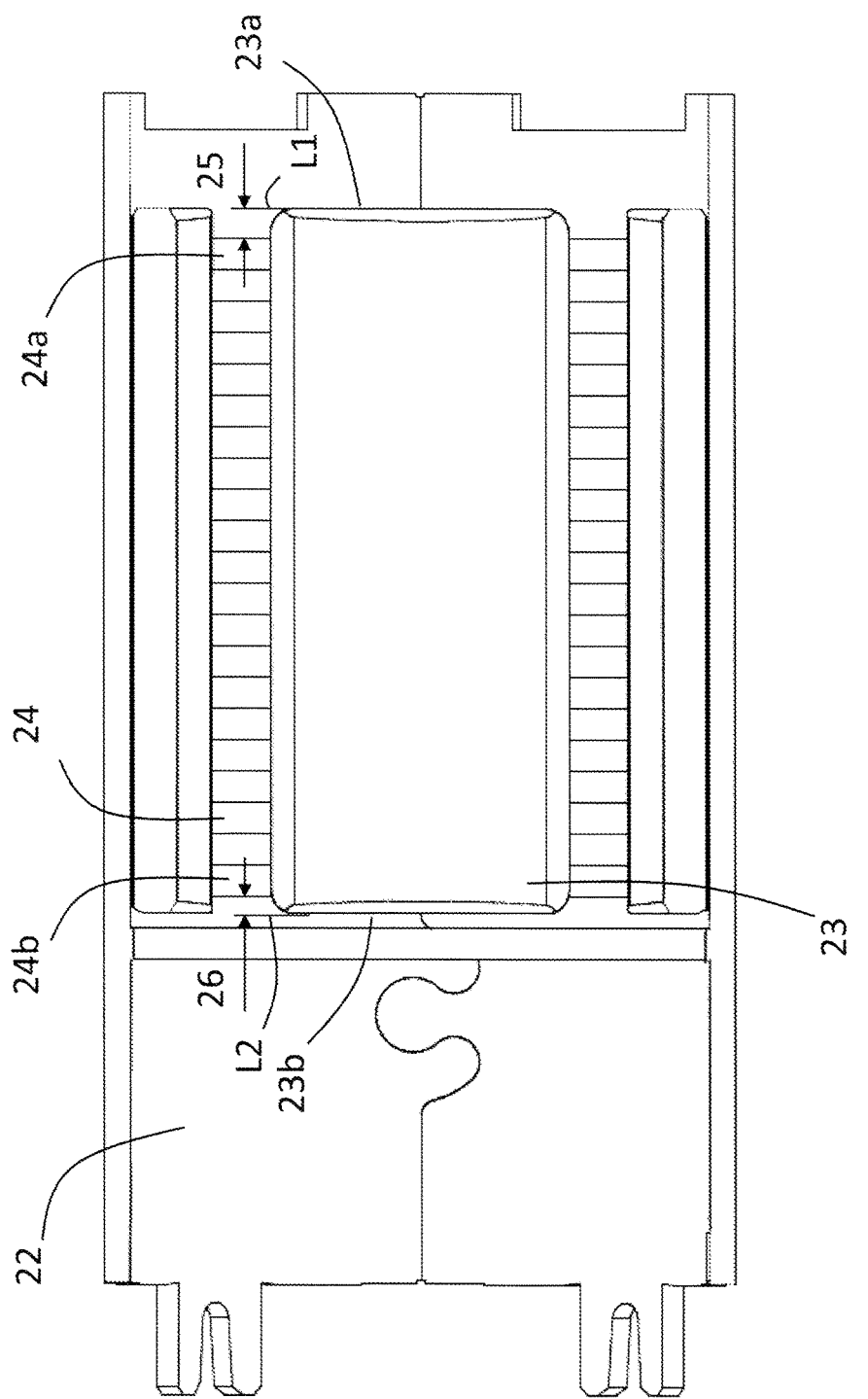
FIG. 6 is a sectional view of the housing assembly of FIG. 3.

Referring also to FIG. 6, the magnets 23 are substantially located at the same level in the axial direction of the housing 22. Each magnet 23 has a first axial end 23a and a second axial end 23b. The first axial ends 23a of the magnets 23 are substantially located at the same level in the axial direction of the housing 22, and the second axial ends 23b of the magnets 23 are substantially located at the same level in the axial direction of the housing 22.

The first axial end 23a of each magnet 23 projects on the inner surface of the housing 22 at a first line L1, and the second axial end 23b of the magnet 23 projects on the inner surface of the housing at a second line L2. The adhesive strips 24 located between the first line L1 and the second line L2 bond the magnets 23 to the housing 22. Among the adhesive strips 24, a first adhesive strip 24a is located closest to the first line L1 and bonds the first axial end 23a of the magnet 23 to the housing 22. A second adhesive strip 24b is located closest to the second line L2 and bonds the second axial end 23b of the magnet 23 to the housing 22. Before the magnets 23 press the adhesive strips 24a, 24b, the adhesive strip 24a is spaced from the first line L1 with a first distance 25.

Preferably, the first distance 25 is from 0.5 millimeter (mm) to 1.0 mm. As such, after the magnets 23 are pressed to the housing 22, the adhesive strip 24a is widened under the pressure and fills or flows into the gaps between the first axial end 23a of the magnet 23 and the inner surface of the housing 22, thus reducing high frequency resonance. In another aspect, the first distance 25 is set to avoid the adhesive protruding beyond the first axial end 23a of the magnet 23 and contaminating the holder.

Preferably, the second adhesive strip 24b is spaced from the second line L2 by a second distance 26a, and the second distance 26 is less than the first distance 25. Preferably, the second distance is not more than 0.5 mm. Alternatively, the second adhesive strip 24b partially overlaps with the second line L2, or coincides with the second line L2.

Alternatively, the adhesive strips can extend in an axial direction of the housing 22, or extend spirally over the inner surface of the housing 22, from one axial end to another axial end of the housing 22.

Figure 7:
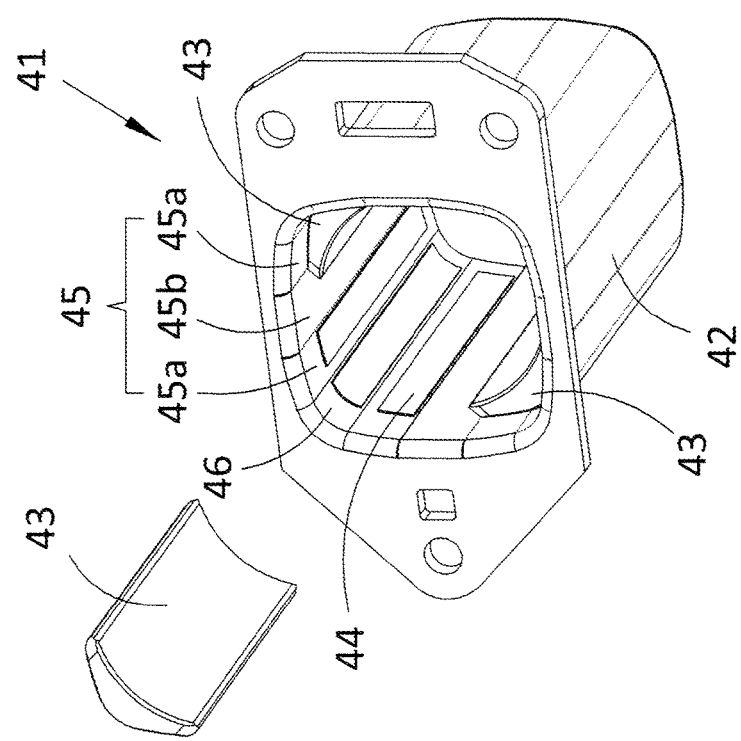
FIG. 7 shows a housing assembly of a motor according to a second embodiment of the present invention.

FIG. 7 shows a housing assembly 41 according to a second embodiment of the present invention. The housing 42 of the housing assembly 41 has a cross section different from that of the housing 22 of the first embodiment. In this embodiment, the cross section of the housing 42 is polygon, rather than annular. Specifically, the cross section of the housing 42 includes four side portions 45 and four corner portions 46. The side portions 45 and the corner portions 46 are alternately arranged in the circumferential direction of the housing 42. The corner portion 46 is curved and convex, and the side portions 45 are curved and convex. In this embodiment, the side portion 45 includes two arc segments 45a and a straight segment 45b connected between the two arc segments 45a. The curvature of the arc segments 45a is less than the curvature of the corner portions 46. The housing assembly 41 also includes four permanent magnets 43, each of which is attached to the housing 42 corresponding to a respective corner portion. Preferably, the central portion of the outer surface of the magnet 43 is attached to the inner surface of the corner portion 46, and each of two circumferential portions of the outer surface of the magnet 43 is attached to a respective adjacent arc segment 45a of a side portion 45 adjacent to the corner portion 46.

The adhesive strips 44, applied on the inner surface of the housing 42, extend in the axial direction of the housing 42. Each magnet 43 is bonded to the housing 42 by at least three adhesive strips 44. At least one of the adhesive strips 44 is applied on the inner surface of the corner portion 46, and at least one of the adhesive strips 44 is applied on the inner surface of each adjacent arc segment 45a of the side portions 45. For this kind of housing 42 having non-circular cross section, axially extending adhesive strips 44 are easier to apply.

It should be noted that one of the magnets in FIG. 7 is shown moved outside of the housing 42 for clarity, but it does not illustrate the mounting process of the magnet 43, such as the direction the magnets 43 move towards the housing.

Figure 8:
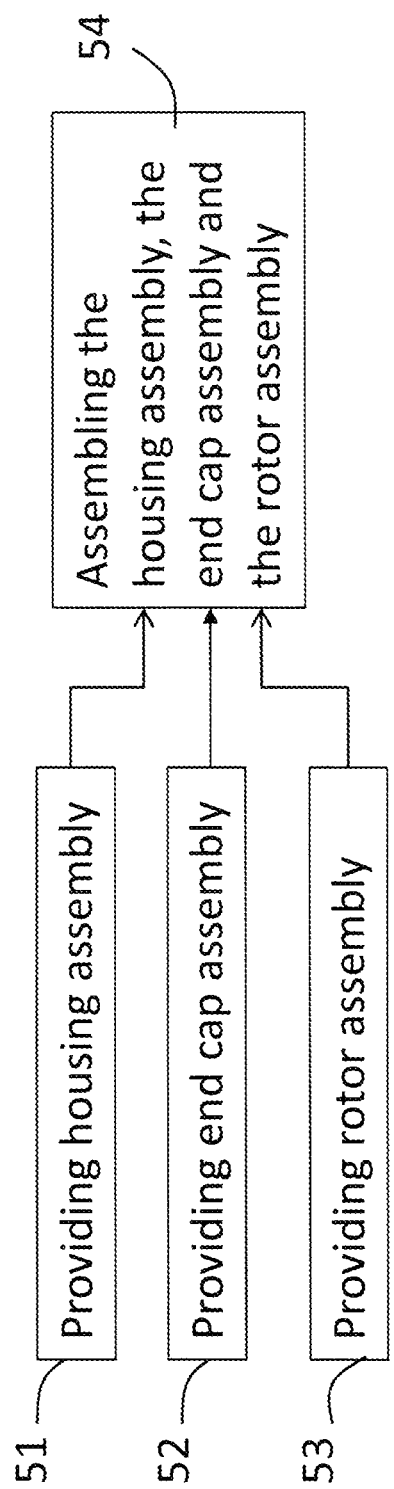
FIG. 8 is a flow chart illustrating a manufacturing method of the motor according to the present invention.
Figure 9:
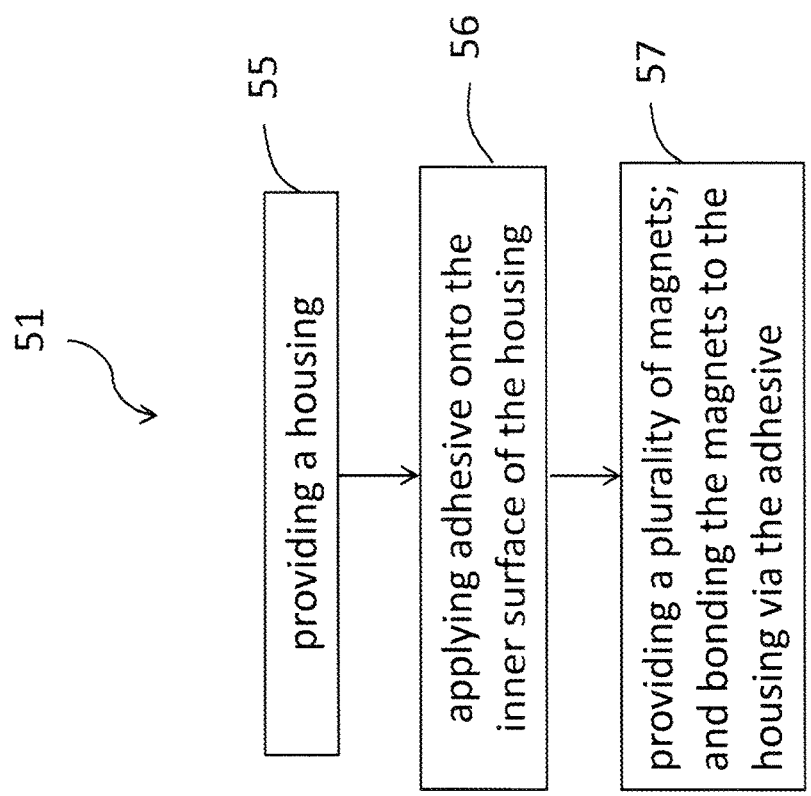
FIG. 9 is a flow chart illustrating a manufacturing method of the housing assembly during manufacturing the motor.

FIG. 8 shows the flow chart of the manufacturing method of the motor of the present invention. The method includes the steps of: providing housing assembly 51; providing end cap assembly 52; providing rotor assembly 53; and assembling the housing assembly, the rotor assembly and the end cap assembly 54 together. FIG. 9 illustrates the step providing the housing assembly 51 in more details. The step 51 includes: providing a housing 55; applying adhesive onto the inner surface of the housing 56; bonding the magnets to the housing via the adhesive 57. It may further include a step of solidifying or curing the adhesive after the magnets are mounted onto the housing when necessary. During the application of the adhesive, the adhesive can be applied in the circumferential direction, axial direction or spiral direction. Preferably, a plurality of adhesive strips are simultaneously formed by a nozzle having a plurality of outlets.

In the description and claims of the present application, each of the verbs "comprise", "include", "contain" and "have", and variations thereof, are used in an inclusive sense, to specify the presence of the stated item but not to exclude the presence of additional items.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Although the invention is described with reference to one or more preferred embodiments, it should be appreciated by those skilled in the art that various modifications are possible. Therefore, the scope of the invention is to be determined by reference to the claims that follow.

The invention claimed is:

1. An electric motor comprising:
   a stator comprising:
      a housing having an open end;
      a plurality of adhesive strips applied on an inner surface of the housing;
      a plurality of magnets bonded to the inner surface of the housing by the adhesive strips, wherein the adhesive covers at least 70% of the outer surface of each magnet after the magnets are assembled to the housing; and
      an end cap assembly mounted to the open end of the housing; and
   a rotor mounted to the stator, wherein the adhesive strips are formed in an annular shape and are arranged in parallel along an axial direction of the housing, each magnet has a first axial end projecting on the inner surface of the housing at a first line, and a second axial end projecting on the inner surface of the housing at a second line, the adhesive strips located between the first line and the second line.

2. The electric motor of claim 1, wherein one of the adhesive strips located closest to the first line is spaced from the first line by a distance ranged from 0.5 mm to 1.0 mm.

3. The electric motor of claim 1, wherein the housing has a non-circular cross section.

4. The electric motor of claim 3, wherein the housing has a polygon cross section, comprising four side portions and four corner portions, the side portions and corner portions are arranged alternately in a circumferential direction of the housing, and the corner portion is curved and convex.

5. The electric motor of claim 4, wherein the side portion is curved and convex.

6. The electric motor of claim 5, wherein the side portion comprises two arc segments and a straight segment connected between the arc segments, each of the arc segments adjoining a respective corner portion.

7. The electric motor of claim 4, wherein the magnets are arranged corresponding to the corner portions, in such a manner that a circumferential central portion of each magnet corresponds to a respective corner portion, and two circumferential end portions of each magnet correspond to side portions adjacent to the corner portion.

8. The electric motor of claim 7, wherein the magnet is bonded to the inner surface of the housing by at least three adhesive strips, at least one of the adhesive strip is applied on the inner surface of the corner portion, and at least one of the adhesive strips is applied on the inner surface of the side portion adjacent to the corner portion.

9. The electric motor of claim 1, wherein the adhesive strips cover at least 80% area of the outer surface of the magnet.

10. The electric motor of claim 1, wherein the adhesive strips cover at least 90% area of the outer surface of the magnet.

11. A method of manufacturing an electric motor, comprising the steps of:
   providing a housing assembly;
   providing a rotor assembly;
   providing an end cap assembly; and
   assembling the housing assembly, the rotor assembly and the end cap assembly together,
   wherein the step of providing the housing assembly comprises:
      providing a housing having an open end;
      applying strips of adhesive onto an inner surface of the housing;
      providing a plurality of magnets; and
      bonding the magnets to the inner surface of the housing via the adhesive, wherein bonding the magnets to the inner surface of the housing comprises pressing the magnets towards the housing to make the strips of adhesive become thinner and wider under the pressure applied by the magnets, wherein before pressing the magnets, the strips of adhesive are spaced from one axial end of each of the magnets positioned to the inner surface of the housing to form a gap between the axial end of each of the magnets and the inner surface of the housing, and then the gaps are filled by one of the trips of adhesive after the magnets are pressed to make the strips of adhesive become thinner and wider.

12. The method of claim 11, wherein the strips of adhesive are applied in a circumferential direction of the housing.

\* \* \* \* \*